US00H002197H

(19) United States

(12) Statutory Invention Registration (10) Reg. No.: US H2197 H

Gord et al. (43) Published: Aug. 7, 2007

(54) DIODE-LASER-BASED MID-INFRARED ABSORPTION SENSOR FOR CARBON MONOXIDE

(75) Inventors: James R. Gord, Dayton, OH (US); Robert P. Lucht, West Lafayette, IN (US); Thomas N. Anderson, West Lafayette, IN (US); Rodolfo Barron-Jimenez, College Station, TX (US); Thomas Walther, Darmstadt (DE); Sukesh Roy, Dayton, OH (US); Michael S. Brown, Dayton, OH (US); Jerald A. Caton, College Station, TX (US)

(73) Assignee: The United States of America as represented by the Secretary of the Air Force, Washington, DC (US)

(21) Appl. No.: 11/025,827

(22) Filed: Dec. 22, 2004

Related U.S. Application Data

(60) Provisional application No. 60/532,486, filed on Dec. 24, 2003.

(51) Int. Cl.
*G01J 5/02* (2006.01)

(52) U.S. Cl. ..... 250/343

(58) Field of Classification Search ..... None
See application file for complete search history.

(56) References Cited

U.S. PATENT DOCUMENTS

H1965 H * 6/2001 Burns et al. ..... 372/22
6,344,648 B1 * 2/2002 Boucher et al. ..... 250/343

OTHER PUBLICATIONS

K. P. Petrov, L. Goldberg, W. K. Burns, R. F. Curl, and F. K. Tittel, "Detection of CO in air by diode–pumped 4.6–μm difference–frequency generation in quasi–phase–matched LiNbO3." Optics Letters, Optical Society of America, vol. 21, No. 1, Jan. 1996, pp. 86–88.*

T. Töpfer, K. P. Petrov, Y. Mine, D. Jundt, R. F. Curl, and F. K. Tittel, "Room temperature mid–infrared laser sensor for trace gas detection." Applied Optics, Optical Society of America, vol. 36, No. 30, Oct. 1997, pp. 8042–8049.*

T. Kelz, A. Schumacher, M. Nägele, B. Sumpf, and H.–D. Kronfeldt, "Detection of Co in Air using Diode Laser Pumped Difference–Frequency Generation in a Modular Setup." J. Quant. Spectrosc. Radiat. Transfer, Pergamon Elsevier Science, vol. 61, No. 5, 1999, pp. 591–601.*

D. Mazzotti, G. Giusfredi, P. De Natale, J. Mitchell, and L. Hollberg, "Difference–frequency radiation around 4.3μm for high sensitivity and sub–Doppler spectroscopy of CO2." Optical Society of America Trends in Optics and Photonics, Advanced Semiconductor Lasers and their Applications, vol. 31, 2000, pp. 122–127, from the Topical Meeting, Jul. 1999.*

* cited by examiner

*Primary Examiner*—Dan Pihulic

(74) *Attorney, Agent, or Firm*—AFMCLO/JAZ; Richard A. Lambert

(57) ABSTRACT

An all-solid-state continuous-wave (cw) laser system for measurements of the absorption by the CO molecule of mid-infrared radiation in the 4.3-4.6 μm range is described, wherein a single-mode, tunable output of a 70 mW, 860-nm ECDL is difference frequency mixed with the output of a 550 mW diode-pumped cw Nd:YAG laser in a PPLN crystal to produce approximately 1 μW of tunable cw radiation at 4.5 μm.

14 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIODE-LASER-BASED MID-INFRARED ABSORPTION SENSOR FOR CARBON MONOXIDE

CROSS REFERENCE TO RELATED APPLICATION

This application claims priority of Provisional Application Ser. No. 60/532,486 filed Dec. 24, 2003, the entire contents of which are incoporated herein by reference.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for precision analysis of gaseous systems, and more particularly to an all-solid-state continuous-wave laser system for mid-infrared (IR) absorption measurements of the carbon monoxide molecule.

In response to an increasing concern in recent years over the environmental impact of combustion emissions, manufacturers are creating new combustion equipment capable of extremely low emissions. Advanced gas turbines now available emit combustion exhaust having less than 10 ppm CO concentration, which lies near the lower detection limit of current sensor technology. To meet this inadequacy in sensor sensitivity, diode-laser-based sensors have been investigated to measure the very low concentrations of CO emissions characteristic of state of the art combustion equipment. Diode-laser-based sensors are characterized by high sensitivity, non-intrusiveness, and potentially continuous, real-time measurements of CO. With these attributes, diode-laser-based sensors may be ideally suited for incorporation into control systems to optimize combustion processes and minimize emissions.

Tunable diode-laser spectroscopy of the CO molecule has been reported on the fundamental band (near 4.6 μm) by using cryogenic lead-salt diode lasers (Varghese et al, "Collision Width Measurements of CO in Combustion Gases Using a Tunable Diode Laser," J Quant Spectr Rad Transfer, 26, 339 (1981); Varghese et al, "Tunable Infrared Diode Laser Measurements of Line Strengths and Collision Widths of 12C16O at Room Temperature," J Quant Spectr Rad Transfer, 24, 479 (1980); Miller et al, "Tunable Diode-Laser Measurement of Carbon Monoxide Concentration and Temperature in a Laminar Methane-Air Diffusion Flame," Appl Opt 32, 6082-89 (1993)). Although successful, the implementation of in situ sensors based on lead-salt diodes has been limited due to operational complexity, the requirement of cryogenic cooling, and multimode operation. The transitions in the second-overtone band (1.3-2 μm region) of CO are about four orders of magnitude weaker than those in the fundamental band. By using an external cavity InGaAsP diode laser (ECDL) in the spectral range 6321-6680 cm-1, Mihalcea et al (Meas Sci Technol, 9, 327-338 (1998); Appl Opt, 36, 8745-52 (1997)) developed a diode laser absorption system for combustion emission measurements. The CO species was detected by identifying the R(13) line in the second-overtone band. In addition to the weakness of the lines, this spectral region includes strong interference from major species such as $CO_2$ and $H_2O$.

With the development of a room temperature continuous wave (cw) single mode InGaAsSb/AlGaAsSb diode laser that operates near 2.3 μm, Wang et al (*Meas Sci Technol,* 11, 1576-84 (2000); *Appl Opt,* 39, 5579-89 (2000)) addressed the first-overtone band of the CO molecule. Transition lines in the first-overtone are about two orders of magnitude stronger than those in the second-overtone band, and several transitions in the R branch are isolated from spectral interference with $CO_2$ and $H_2O$. Wang et al determined CO concentrations in the post-flame region (R(30) transition at 4343.81 $cm^{-1}$) as well as the exhaust duct (R(15) transition at 4311.96 $cm^{-1}$). For measurements in the post-flame zone, CO concentrations in rich flames were in good agreement with chemical equilibrium predictions. For measurements in the exhaust, the system achieved a detection limit of 1.5 ppm m at 470 K (50 kHz detection bandwidth, 50 sweep average, 0.1 s total measurement time). Wavelength modulation spectroscopy techniques were used to achieve a sensitivity of 0.1 ppm m (500 Hz detection bandwidth, 20 sweep average, 0.4 s total measurement time).

In attempting to detect CO in ambient air (typical abundance 150 ppb), Petrov et al (*Optics Letters,* 21, 86-88 (1996)) addressed the CO fundamental band at the R(6) transition near 2169 $cm^{-1}$. Petrov et al investigated the use of a diode-pumped mid-IR difference-frequency mixing (DFM) source based on a periodically-poled $LiNbO_3$ (PPLN) crystal to detect atmospheric CO, $N_2O$ and $CO_2$. Their tunable mid-IR DFM source mixed a diode-pumped Nd:YAG laser (237 mW at 1064 nm single longitudinal mode) and a high power tapered GaAlAs amplifier pump seeded by a single frequency laser diode that allows fast frequency tuning by means of current modulation. With this system the detection sensitivity of 5 ppb M/√Hz was extrapolated based on rms noise measured in the 2f spectra under interference-free conditions.

The sensor system described herein solves or substantially reduces in importance inadequacies in prior art systems as described in the foregoing discussions by addressing mid-IR CO transitions in the fundamental band by means of DFM in a PPLN crystal using a novel compact Nd:YAG laser system that provides pump power, and the incorporation of an external-cavity diode laser (ECDL) that allows for frequency tuning. The invention is potentially applicable to numerous other molecules in the IR spectral region, such as as $CO_2$, $H_2O$, and $C_2H_2$.

The sensor described by the invention will allow real time monitoring of CO emissions from combustor systems such as gas turbine engine combustors. The invention may be incorporated into control systems to optimize combustion processes and minimize CO emissions by providing continuous, real-time CO measurements. The laser radiation is tunable and the laser can be tuned to the fundamental transitions of the CO molecule, resulting in estimated sensitivities of better than 1 ppm CO for a 1 meter path length in 1000 K gas.

It is therefore a principal object of the invention to provide a system for analysis of gaseous systems.

It is a further object of the invention to provide an improved system and method for precision analysis of flowing gaseous systems.

It is another object of the invention to provide an all-solid-state continuous-wave laser system for mid-infrared absorption measurements of the CO molecule.

These and other objects of the invention will become apparent as a detailed description of representative embodiments proceeds.

SUMMARY OF THE INVENTION

In accordance with the foregoing principles and objects of the invention, described is an all-solid-state continuous-wave (cw) laser system for measurements of the absorption by the CO molecule of mid-infrared radiation in the 4.3-4.6 μm range, wherein a single-mode, tunable output of a 70 mW, 860-nm ECDL is difference frequency mixed with the output of a 550 mW diode-pumped cw Nd:YAG laser in a PPLN crystal to produce approximately 1 μW of tunable cw radiation at 4.5 μm. The wavelength of the 860-nm ECDL is then scanned over a CO absorption line to produce a fully resolved absorption spectrum.

DETAILED DESCRIPTION

Figure 1:
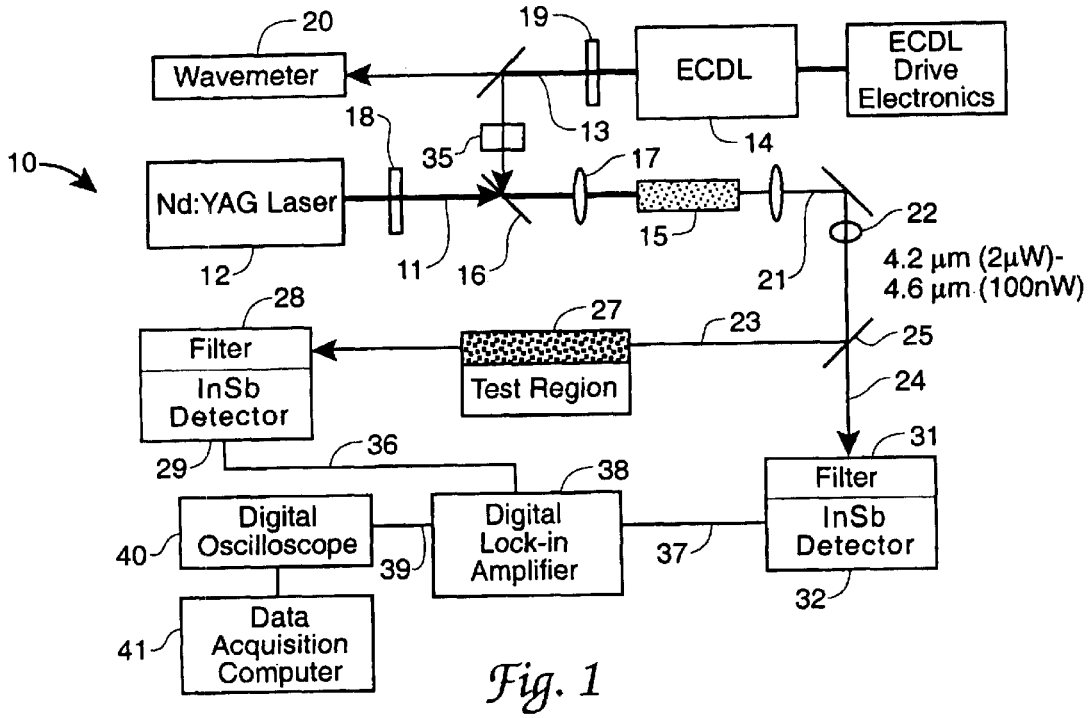
FIG. 1 is a schematic diagram of a representative embodiment of the mid-infrared carbon monoxide sensor system of the invention.

Referring now to the drawings. FIG. 1 illustrates schematically in a representative embodiment the mid-infrared CO sensor system 10 of the invention. Representative sensor system 10 is configured as an all solid state continuous-wave (cw) laser system for measurements of the absorption by the CO molecule of infrared (IR) radiation in the 4.3-4.6 μm range. Transitions in this spectral region are in the fundamental band of CO with high line strengths.

Laser radiation (beam) 11 from a 550-mW, 1064-nm diode pumped Nd:YAG laser 12 (CrystaLaser®, Reno Nev.) is difference-frequency mixed (DFM) with radiation (beam) 13 from 60-mW, 860-nm external-cavity diode laser (ECDL) 14 (Toptica Photonics AG, Munich GE) in a 40 mm long periodically-poled lithium-niobate (PPLN) crystal 15, producing about 1 μW of tunable cw radiation at 4.5 μm. Beams 11,13 were overlapped on a dichroic mirror 16 and focused with a bi-convex 300-mm focal length lens 17 into crystal 15. Lens 17 was chosen so that the Rayleigh range and waist diameter of beams 11,13 were as large as possible to match the crystal 15 length and be contained within the crystal body. A telescope was used to adjust focus and beam size of beam 11 to optimize conversion efficiency. Half wave plates 18,19 were disposed in beams 11,13 to allow adjustment of the polarization of the beams. Single-mode operation of ECDL 14 was protected by a 36-dB Faraday isolator (not shown) to block back reflections.

Wavemeter 20 (Burleigh WA-1000 cw) was used to measure wavelengths of beams 11,13. The vacuum wavelength of beam 11 was fixed and measured at 1064.664 nm; ECDL 14 delivered an optimized wavelength of 852 nm and the initial DFM output was just less than 2 μW at 4.3 μm. The wavelength coarse tuning capabilities of ECDL 14 allowed beam 13 to be readjusted to address various CO transitions in the fundamental band. The vacuum wavelength of ECDL 14 was tuned to 861.565 nm for initial measurements so that the 4.489 μm DFM output of the sensor system was in resonance with the R(24) transition in the CO fundamental band. The frequency spectrum of ECDL 14 was monitored with a Burleigh SA Plus spectrum analyzer as the ECDL output was tuned at 1.3 Hz over a mode-hop-free tuning range of 12 GHz.

PPLN crystal 15 was housed in a constant-temperature oven (not shown) to tune the longitudinal spatial period of crystal 15 to the correct dimension for a particular wavelength. The generated radiation 21 (4.3 to 4.6 μm) was then collimated using $CaF_2$ lens 22 and split into signal beam 23 and reference beam 24 using 50-50 beamsplitter 25.

The wavelength of ECDL 14 was scanned so that the generated mid-IR scans over a CO absorption line to produce a fully resolved absorption spectrum. The sensitivity of the system is of the order of 1 ppm for a 1 m path length through 1000 K combustion gas in a laboratory controlled environment. A substantially lower absorption level (10-5 or less) can be measured using wavelength modulation spectroscopy (WMS) or frequency modulation spectroscopy.

Signal beam 23 was transmitted through test region 27 comprising a gas cell filled with either argon or a mixture of CO and other buffer gases or sample combustion exhaust gases. Beam 23 was then passed through bandpass filter 28 configured to reject the 860-nm and 1064-nm radiation and focused onto InSb detector 29. Reference signal 24 was transmitted through bandpass filter 31 and focused onto a second InSb detector 32.

An optical chopper 35 was placed in the 860-nm laser beam 13 and detector signals 36,37 were processed by lock-in amplifier 38 synchronized with optical chopper 35 to reduce noise on signals 36,37 to about 0.1% rms standard deviation. Output 39 of amplifier 38 was recorded on computer 41 controlled Tektronix 10,000-channel digital oscilloscope 40. Typically, eight traces were digitally averaged in oscilloscope 40. Spectral line shapes were not affected. Simultaneous detection of signal and reference beams 29,32 allowed for subtraction of common-mode noise and etalon effects at the crystal surfaces and significantly enhanced detection efficiency.

System 10 was demonstrated experimentally using a 30 cm long gas cell (test region) 27 at room temperature filled with 1000 ppm CO (nominal concentration) in nitrogen ($N_2$). Traces from signal and reference detectors 29,32 were recorded and cell 27 was evacuated and filled with $N_2$ at the same pressure as the CO mixture. The ratio of the signal to reference detectors at the CO mixture conditions was normalized by the ration in the absence of CO to account for background.

Figure 2:
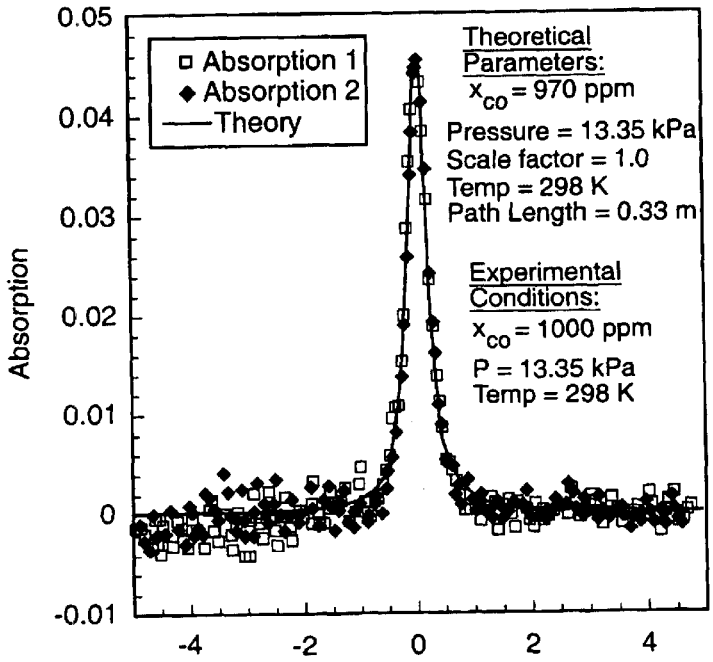
FIG. 2 is a plot of absorption versus frequency detuning comparing measured and calculated CO absorption line shape for the R(24) transition fundamental band at 2227.639 $cm^{-1}$.

FIG. 2 shows a plot of absorption versus frequency detuning comparing measured and calculated CO absorption line shape for the R(24) transition fundamental band at 2227.639 $cm^{-1}$. For the FIG. 2 measurements, cell 27 was filled with 1000 ppm CO in $N_2$ at room temperature and 13.35 kPa pressure, this gas mixture having the nominal concentration of an analyzed gas cylinder (Matheson & Company) within 10% uncertainty. The best fit of the data corresponds to a theoretical CO concentration of 970 ppm with an uncertainty in the CO concentration of the order of 20 ppm. The experimental results were in excellent agreement with the theoretical line shape.

In the demonstration of the invention using hot (about 1000 to 1800° F.) exhaust gases from a combustion source (well stirred type reactor), the presence of $CO_2$ caused spectral interference with CO transitions in the R branch of the fundamental band for J values higher than 14. The CO transition R(11) in the fundamental band at 2186.639 $cm^{-1}$ was therefore selected as the target transition. To achieve mid-IR generation in this region, the ECDL was coarse-tuned to higher wavelengths, because the system was originally optimized for 852 nm. The diode laser in the ECDL was replaced with one optimized for 862-nm, and was operated at 863.612 nm with 32.3 mW of power and scanned over a mode-hop-free tuning range of 14 GHz.

Figure 3A:
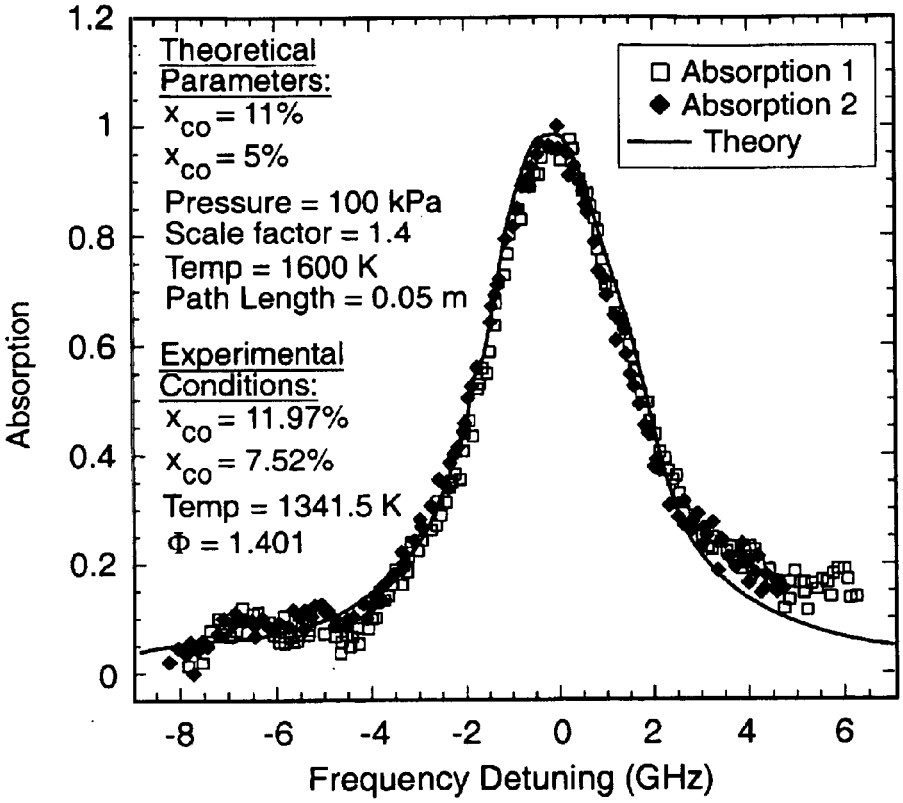
FIGS. 3*a* and 3*b* are plots of absorption versus frequency detuning comparing measured and calculated CO absorption line shapes for the R(11) transition fundamental band at 2186.639 $cm^{-1}$.
Figure 3B:
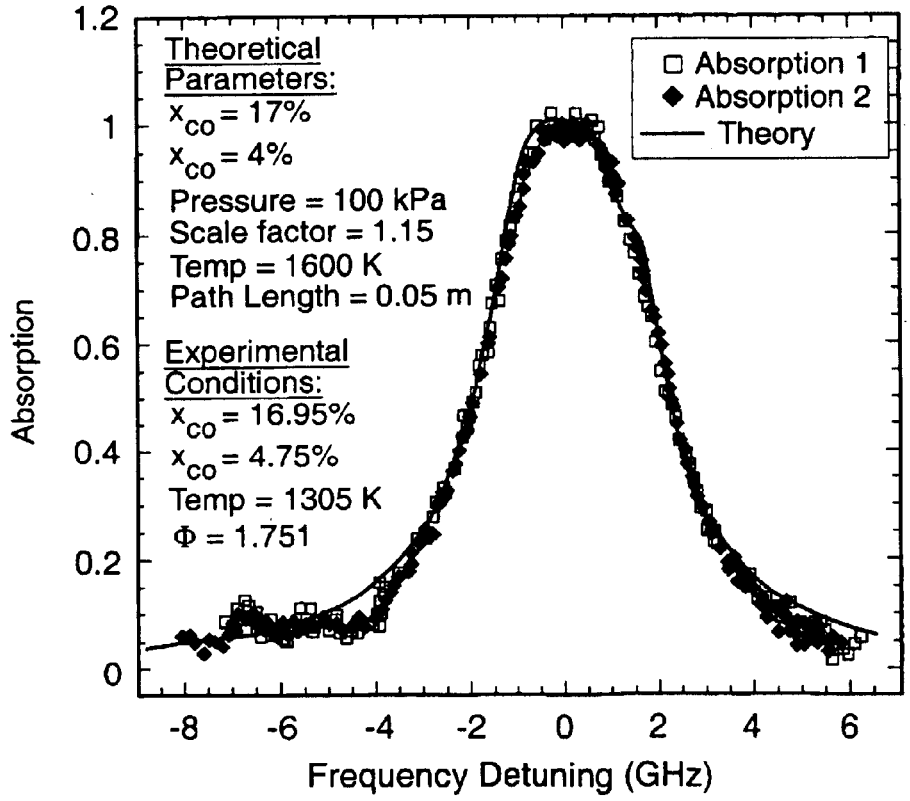

Referring now to FIGS. 3*a* and 3*b*, shown therein are plots of absorption versus frequency detuning comparing measured and calculated CO absorption line shapes for the R(11) transition fundamental band at 2186.639 $cm^{-1}$. The combustion source was run on ethylene at equivalence ratios of $\phi$=1.401 (top) and $\phi$=1.751 (bottom). As evident in FIGS. 3*a* and 3*b*, the high CO concentration absorbed almost 100% of the signal beam.

In both FIGS. 3*a* and 3*b*, the only visible species is CO. While $CO_2$ is present in the exhaust, its concentration is comparable to the CO concentration, and since the $CO_2$ transitions have intensities two orders of magnitude lower than CO, the $CO_2$ concentration has no effect on the fitting procedure. The CO concentration obtained from the best fit to the experimental curves aggrees within 15% of the reported value from the extractive sampling.

The sensitivity of the sensor was limited substantially only by the noise in the detection channel. For the gas cell measurements, the rms standard deviation was 0.1%, which corresponds to a detection limit of less than 1 ppm per meter path length in 1000 K gas. This assumes a S/N ratio of 1 at the detection limit. For measurements using the combustion source, the intrinsic noise was calculated to be 1.7% rms standard deviation, and, assuming a S/N ratio of 1 at the detection limit, this corresponds to about 21 ppm per meter path length for gas at 1000 K.

The invention therefore provides an all-solid-state cw laser system for mid-infrared absorption measurements of the CO molecule. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. A continuous-wave laser system for measurements of the absorption by the CO molecule of mid-infrared radiation in the 4.3-4.6 μm range, comprising:

(a) a first laser for providing a first output beam at nominally 860 nm;

(b) a second laser for providing a second output beam at nominally 1064 nm;

(c) means for overlapping said first and second beams and difference frequency mixing said first and second beams to produce a tunable third beam in the range of 4.3 to 4.6 μm;

(d) means defining a test region for containing a sample for measurement;

(e) means for collimating said third beam and means for splitting said third beam into a signal beam and a reference beam and passing said signal beam through said test region; and (f) detector means for comparing said signal beam and said reference beam.

2. The system of claim 1 wherein said first laser is a tunable, single mode external cavity diode laser.

3. The system of claim 1 wherein said second laser is a diode pumped Nd:YAG laser.

4. The system of claim 1 wherein said means for overlapping said first and second beams and difference frequency mixing said first and second beams includes a dichroic mirror and focusing lens.

5. The system of claim 1 wherein said means for difference frequency mixing said first and second beams comprises a periodically poled lithium niobate crystal.

6. The system of claim 1 wherein said means for collimating said third beam and splitting said third beam into a signal beam and a reference beam includes a $CaF_2$ lens and a beamsplitter.

7. The system of claim 1 further comprising first and second half wave plates disposed respectively in the paths of said first and second beams for adjusting the polarization of said first and second beams.

8. A method for measuring the absorption by the CO molecule of mid-infrared radiation in the 4.3-4.6 μm range, comprising the steps of:

(a) providing a first laser beam at nominally 860 nm;

(b) providing a second laser beam at nominally 1064 nm;

(c) overlapping said first and second beams and difference frequency mixing said first and second beams to produce a tunable third beam in the range of 4.3 to 4.6 μm;

(d) providing a test region for containing a sample for measurement;

(e) collimating said third beam and splitting said third beam into a signal beam and a reference beam and passing said signal beam through said test region; and (f) comparing said signal beam and said reference beam.

9. The method of claim 8 wherein said first laser is a tunable, single mode external cavity diode laser.

10. The method of claim 8 wherein said second laser is a diode pumped ND:YAG laser.

11. The method of claim 8 wherein the step of overlapping said first and second beams and difference frequency mixing said first and second beams is performed using a dichroic mirror and focusing lens.

12. The method of claim 8 wherein the step of difference frequency mixing said first and second beams is performed using a periodically poled lithium niobate crystal.

13. The method of claim 8 wherein the step of collimating said third beam and splitting said third beam into a signal beam and a reference beam is performed using a $CaF_2$ lens and a beamsplitter.

14. The method of claim 8 further comprising the step of selectively matching the polarization of said first and second beams.

* * * * *